(12) United States Patent
Chan et al.

(10) Patent No.: US 11,397,983 B2
(45) Date of Patent: Jul. 26, 2022

(54) METHOD, SYSTEM AND STORAGE MEDIUM FOR PROVIDING TIMELINE-BASED GRAPHICAL USER INTERFACE

(71) Applicant: COMPAL ELECTRONICS, INC., Taipei (TW)

(72) Inventors: Chieh-Yu Chan, Taipei (TW); Chiao-Tsu Chiang, Taipei (TW); Hao-Chen Weng, Taipei (TW); Ya-Fang Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/065,539

(22) Filed: Oct. 8, 2020

(65) Prior Publication Data

US 2021/0158432 A1 May 27, 2021

Related U.S. Application Data

(60) Provisional application No. 62/940,202, filed on Nov. 25, 2019.

(51) Int. Cl.
*G06F 3/04812* (2022.01)
*G06F 3/04842* (2022.01)
*G06Q 30/06* (2012.01)
*G06Q 30/02* (2012.01)
*G06T 11/60* (2006.01)

(52) U.S. Cl.
CPC ..... *G06Q 30/0643* (2013.01); *G06F 3/04812* (2013.01); *G06F 3/04842* (2013.01); *G06Q 30/0276* (2013.01); *G06T 11/60* (2013.01)

(58) Field of Classification Search
CPC ............... G06Q 30/0643; G06Q 30/0276; G06T 11/60; G06T 11/001; G06F 3/04812; G06F 3/04842; G06F 3/0481; G06F 3/0482; G06F 3/04845; G06F 3/0488; G06F 9/451

See application file for complete search history.

(56) References Cited

U.S. PATENT DOCUMENTS

| 2008/0062141 A1* | 3/2008 | Chandhri | G06F 1/1694 345/173 |
| 2009/0172543 A1* | 7/2009 | Cronin | G06F 3/0485 715/721 |

(Continued)

OTHER PUBLICATIONS

Ruochen Si et al., Timeline colaging as an extension of map collaging using geo-referencing and time-referencing, Nov. 1, 2017, IEEE Xplore, pp. 142-149 (Year: 2017).*

(Continued)

*Primary Examiner* — Tam T Tran (57) ABSTRACT

A method for providing a timeline-based graphical user interface includes displaying a plurality of edited images on a graphical user interface, and arranging edited images according to a timeline, with each of the edited images having a specific feature; and enlarging one of the edited images, which is the closest to a pre-defined visual center of the graphical user interface. The graphical user interface is substantially in a shape of a rectangle. The edited images are arranged along a straight line, which is parallel to a long side of the rectangle and passes a center of the rectangle.

33 Claims, 12 Drawing Sheets

(56) References Cited

U.S. PATENT DOCUMENTS

| | | | | |
|---|---|---|---|---|
| 2012/0102431 A1* | 4/2012 | Krolczyk | ............ | G11B 27/329 |
| | | | | 715/790 |
| 2015/0256899 A1* | 9/2015 | Chand | ................. | H04N 21/812 |
| | | | | 725/34 |
| 2018/0337994 A1* | 11/2018 | Dachille | ............ | H04L 67/1097 |

OTHER PUBLICATIONS

Shao-Ping Lu et al., Timeline Editing of Objects in Video, Jun. 26, 2012, IEEE Transactions on Visualization and Computer Graphics, vol. 19, No. 7, pp. 1218-1222 (Year: 2012).*

* cited by examiner

Rules

| $Roles / According to account relationship | | $Meeting day | $Sweet words |
|---|---|---|---|
| Replaceable Glossary | Dad / father / dad | One month | Love you Miss you Kiss you |
| | Mom / mother / Mama/mummy | Two months | |
| | | Three months | |
| | | Four months | |
| | | Five months | |
| | | Six months | |
| | | Seven months | |
| | | Eight months | |
| | | Nine months | |
| | | Ten months | |
| | Grandfather | Eleven months | |
| | Grandmother | Twelve months | |

FIG. 5B

Birthday          154

| Triggering | Sentence structure | Example sentences |
|---|---|---|
| Baby's birthday (0 year) | $character, I was born | Mom, I was born |
| Baby's birthday (except 0 year old) | Wow, this is my birthday! | Not applicable |
| | Happy Birthday to me | Not applicable |
| | Best birthday because of $character | Best birthday because of mommy |
| | I want my birthday party! | Not applicable |

FIG. 5C

Vacations (taking the United States for example)

| Vacation | Triggering | Sentence structure | Example sentences |
|---|---|---|---|
| New Year | 1/1 | Happy New Year, $role | Happy new year mummy! |
| Valentine's day | 2/14 | Happy Valentine's Day $characterr, Give $Role (another companion) a kiss | Happy Valentine's Day Mom, give Dad a kiss |
| April fools' day | 4/1 | Today is April Fool's Day, but I am very smart! | Not applicable |
| Mother's day | The second Sunday in May | Mom I love you, thank you very much (to mom) | Not applicable |
| | | Wish mom happy mother's day, dad (to dad) | Not applicable |
| Father's day | The third Sunday in June | Dad, I love you, thank you very much (to Dad) | Not applicable |
| | | Happy father's day to father, mom (to mom) | Not applicable |
| Independence Day | 7/4 | Independence Day, I became more independent! | Not applicable |
| Halloween | 10/31 | Trick or treat! | Not applicable |
| Thanksgiving | The last day of November | Thanksgiving, thank you $character | Thanksgiving, thank you mommy! |
| Christmas | 12/25 | Do I have a Christmas present? $Role? | I have Christmas Gift? Father? |

FIG. 5D

Growth milestone

| Baby's behavior | Stage | Triggering | Sentence structure | Example sentences |
|---|---|---|---|---|
| Born | 0 years | Date (birthday) | $role, I'm so happy to be in this world | Mom, I am very happy to be in this world |
| Turning over | March to May | Date (birthday + 110 days) | $role, I'm practicing turning | Mom, I'm practicing turning over |
| Sitting | May to July | Date (birthday + 160 days) | $role, I am learning how to sit up | Dad, I am learning how to sit up |
| Crawling | July to August | Date (birthday + 220 days) | $role, take pictures for me as I crawl | Mom, take pictures of me as I crawl |
| Standing/ supporting | September to October | Date (birthday + 280 days) | $role, can you help me practice standing up? | Dad, can you help me practice standing up? |
| Standing/ walking alone | November to December | Date (birthday + 340 days) | $role, I almost got up on my own! | Dad, I almost got up on my own! |

METHOD, SYSTEM AND STORAGE MEDIUM FOR PROVIDING TIMELINE-BASED GRAPHICAL USER INTERFACE

CROSS-REFERENCE TO RELATED APPLICATION

This non-provisional application claims priority under 35 U.S.C. § 119(e) on U.S. provisional Patent Application No. 62/940,202 filed on Nov. 25, 2019, the entire contents of which are hereby incorporated by reference.

BACKGROUND OF THE INVENTION

1. Field of the Invention

The present disclosure relates to methods and systems for providing a user interface, and in particular to a method and system for providing a graphical user interface capable of displaying information in specific ways.

2. Description of the Related Art

It is always an important technical issue about software-based enhancement and hardware-based enhancement to the efficiency of users' operating graphical user interfaces. Depending on the intended applications, engineers devise various graphical user interface functions to be performed with electronic devices and adjust the interface operation mechanism and the information displaying process, so as to improve user experience.

For instance, the surveillance camera only performs a surveillance function. After taking images at different time points, the conventional surveillance camera is incapable of identifying and sorting images automatically, thereby imposing a burden on users under certain circumstances. For instance, although the conventional surveillance camera is effective in taking images of babies daily to record developmental milestones of the babies, parents have to take time sorting the images. In view of the aforesaid drawback of the prior art, it is important to provide a user interface capable of identifying, sorting and displaying images automatically, so as to greatly reduce users' burden.

BRIEF SUMMARY OF THE INVENTION

It is an object of the present disclosure to provide a method, system and electronic device readable storage medium for providing a timeline-based graphical user interface to automatically identify, sort and display images, thereby significantly reducing users' burden.

To achieve at least the above object, the present disclosure provides a method for providing a timeline-based graphical user interface, comprising the steps of: receiving a plurality of edited images; and displaying the edited images on a graphical user interface and arranging the edited images according to a timeline, each of the edited images comprising a specific feature, wherein the graphical user interface is substantially in a shape of a rectangle, and the edited images are arranged along a straight line, which is parallel to a long side of the rectangle and passes a center of the rectangle.

In an embodiment, one of the edited image, which is the closest to a pre-defined visual center of the graphical user interface, is larger than remaining ones of the edited images and is provided with a special effect or deprived of a special effect.

In an embodiment, the specific feature is a facial expression feature. The step of editing images to obtain the edited images comprises: determining a center position of a face area corresponding to a facial expression feature and cutting the images including the face area centered at the center position of the face area.

In an embodiment, the graphical user interface has a dialog box corresponding to the edited images. The dialog content is obtained from a dialog database in accordance with an attribute and displayed in the dialog box. The attribute comprises a date related to the edited images.

In an embodiment, when the edited image is located at a pre-defined visual center of the graphical user interface, the edited image is enlarged.

In an embodiment, the graphical user interface is substantially in a shape of a rectangle. The edited images are arranged along a straight line, which is parallel to a long side of the rectangle and passes a center of the rectangle.

In an embodiment, the graphical user interface displays a prompt message corresponding to the edited image. Upon the prompt message is selected and a preference tag is set, an advertisement information corresponding to the prompt message is displayed. When an advertisement information is selected, a product purchase process is started.

According to another aspect of the present disclosure, a system for providing a timeline-based graphical user interface comprises a processor, a display device and a storage device. The storage device stores a plurality of program commands, such that the processor performs, after executing the program commands, the steps of: receiving a plurality of edited images and arranging the edited images on a graphical user interface according to a timeline, each of the edited images comprising a specific feature. The graphical user interface is substantially in a shape of a rectangle. The edited images are arranged along a straight line, which is parallel to a long side of the rectangle and passes a center of the rectangle.

According to another aspect of the present disclosure, a non-transient storage medium stores a plurality of program commands. After executing the program commands, an electronic device performs the steps of: receiving a plurality of edited images and arranging the edited images on a graphical user interface according to a timeline, each of the edited images comprising a specific feature. The graphical user interface is substantially in a shape of a rectangle. The edited images are arranged along a straight line, which is parallel to a long side of the rectangle and passes a center of the rectangle.

Therefore, the present disclosure can automatically identify and edit images with a specific feature and display the edited images according to a timeline on a graphical user interface to greatly reduce the user's burden.

DETAILED DESCRIPTION OF THE INVENTION

To facilitate understanding of the object, characteristics and effects of this present disclosure, embodiments together with the attached drawings for the detailed description of the present disclosure are provided.

Figure 1:
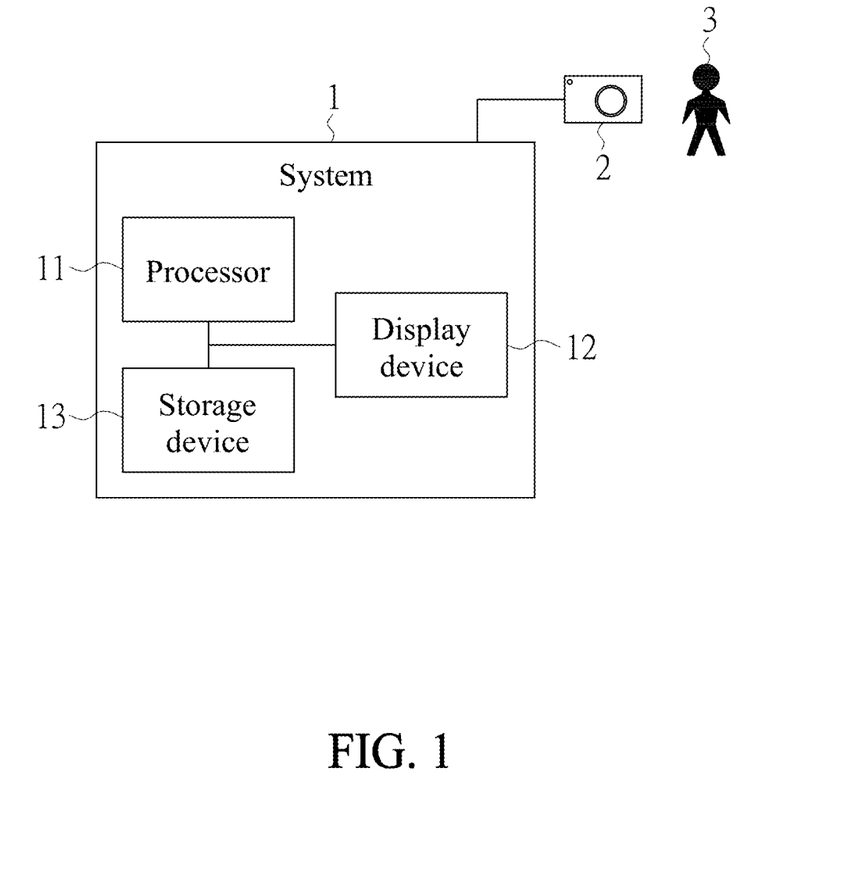
FIG. 1 is a schematic view showing a system for providing a timeline-based graphical user interface according to an embodiment of the present disclosure.

Referring to FIG. 1, a system 1 for providing a timeline-based graphical user interface according to an embodiment of the present disclosure comprises a processor 11, a display device 12 and a storage device 13. In this embodiment, the system 1 is operated on a mobile electronic device, for example, a smartphone or a tablet. The processor 11 is a main processor of a mobile electronic device. The display device 12 is a touchscreen for displaying a user interface and converting a user's touch into a control signal. The storage device 13 is a non-transient memory for an electronic device, such as flash memory or any other types of memory. The storage device 13 stores therein program commands executable by the processor 11. After executing the program commands, the processor 11 of the system 1 performs related steps.

In a variant embodiment, the system 1 comprises a cloud server and a mobile electronic device. The cloud server and the mobile electronic device (such as a smartphone) are connected by a wireless telecommunication network to construct a connection to the Internet, so as to facilitate data transmission. The processor 11 comprises a processing unit of the cloud server and a main processor of the mobile electronic device. The display device 12 is disposed at the mobile electronic device. The storage device 13 comprises a disk drive array of the cloud server and a flash memory of the mobile electronic device. Given the aforesaid structure and computation such as recognizing and editing graphics, after being processed by the cloud server, the data are transmitted to the mobile electronic device by the Internet, so as to speed up the processing process and reduce the load of the mobile electronic device.

In this embodiment, the system 1 is in signal connection with a camera 2. The camera 2 is externally connected to the mobile electronic device, is in wireless signal connection with the mobile electronic device, or is built in the mobile electronic device. The camera 2 takes images of a target 3. The target 3 is not physically independent and thus must be looked after by others, and can be a baby, patient or elderly person who needs long-term care. The camera 2 is configured to take images of the target 3 regularly and automatically and transmit the images to the system 1. Therefore, a user of the system 1 can monitor the target 3 with the images taken by the camera 2.

Figure 2:
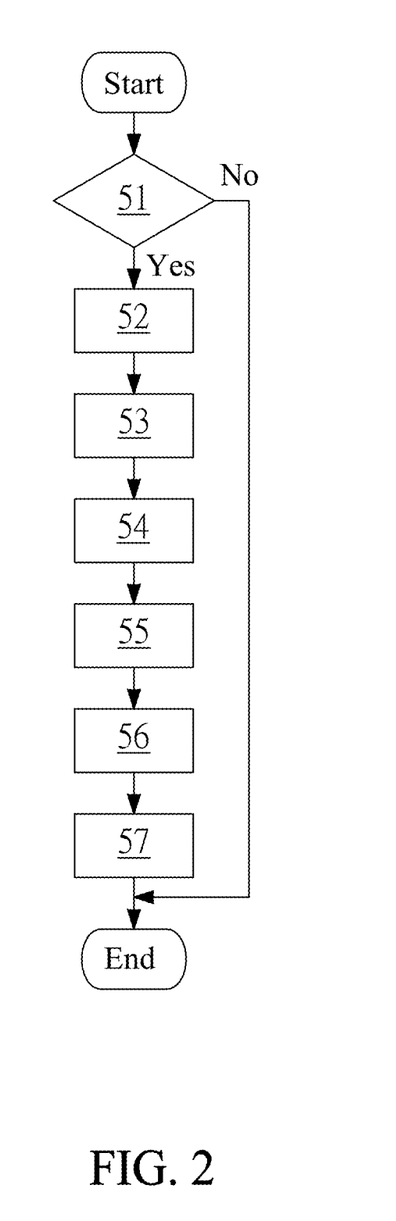
FIG. 2 is a flowchart of a method for providing a timeline-based graphical user interface according to an embodiment of the present disclosure.

The steps performed by the processor 11 of the system 1 upon execution of the program commands are described below. Referring to FIG. 2, after receiving one or more images taken by the camera 2, the system 1 performs step 51 to determine whether the received images are satisfactory, for example, whether each image comprises a specific feature. In this embodiment, the specific feature is a specific facial expression feature of the target 3, for example, smiling or crying. The program commands executable by the processor 11 include an artificial intelligence engine capable of searching the images for a specific facial expression feature or an analysis algorithm or program capable of determining whether the images comprises a specific facial expression feature. For instance, if the artificial intelligence engine confirms the eye and mouth positions in the images and confirms that the mouth's shape conforms with the smiling feature, it will be determined that the images comprises the specific feature, which is smiling.

Figure 3:
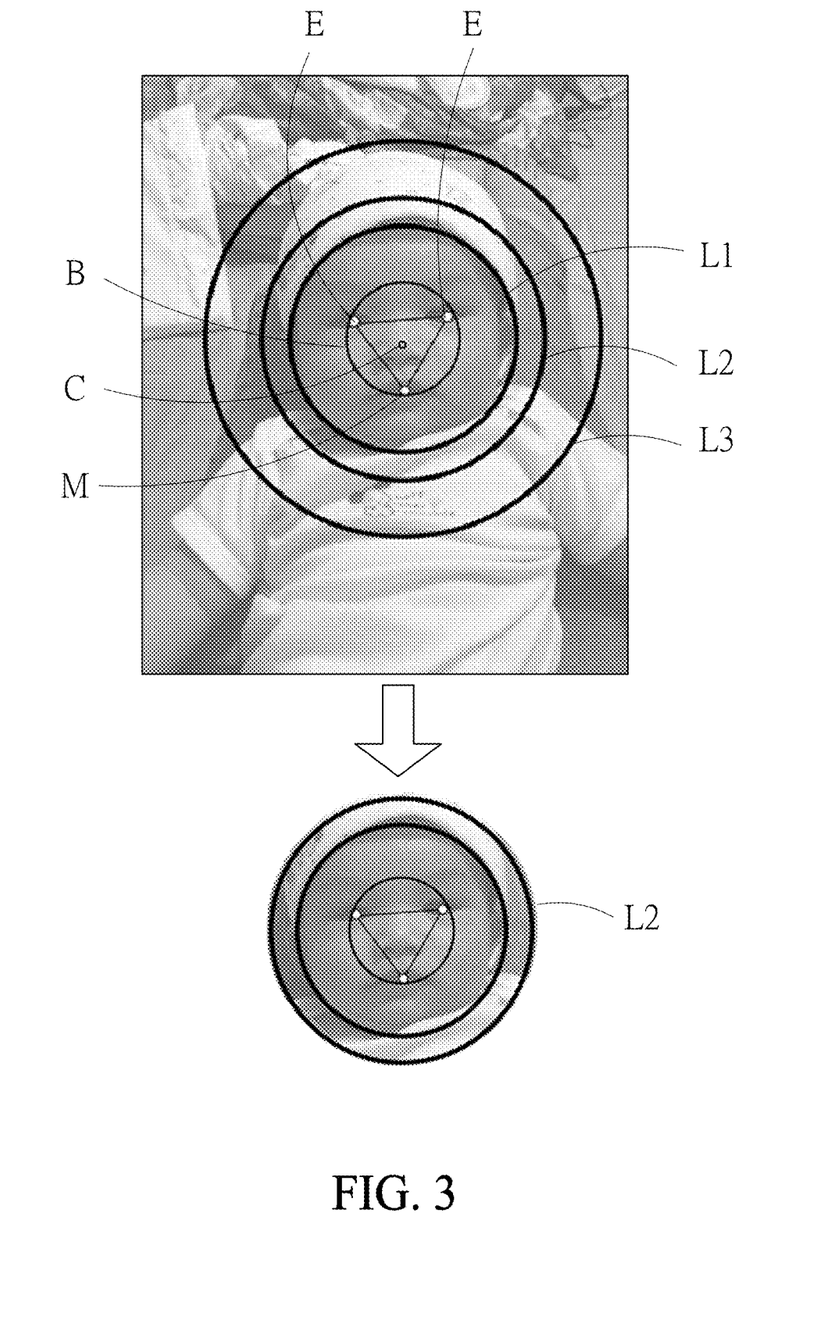
FIG. 3 is a schematic view showing how to obtain edited images according to an embodiment of the present disclosure.

If the image includes a specific feature (for example, a facial expression feature), the system 1 performs step 52 to determine a center position C of a face area corresponding to the facial expression feature. Referring to FIG. 3, in the image, after positions of the eyes E and mouth M have been confirmed, based on the three respective centers of the positions of the eyes E and mouth M, a center position C of the face area is determined. Then, the face area centered at the center position C is cut out and covered with a mask in a specific shape to attain a round edited image. For instance, a standard circle B, which has a center (i.e., the center position C) and passes through two eye E and one mouth M positions, is predetermined, and then enlarged circles L1, L2, L3 which have radii 2 times, 2.5 times or 3 times greater and are centered at the center position C are determined. Next, the face area centered at one of the enlarged circles, such as L2, is cut out and covered with a round mask to attain an edited image. The radius of the round mask is a predefined value or is determined randomly or in accordance with the ratio of the standard circle to the image in size. The cutting and the mask-based covering may be carried out on different devices. For instance, the cutting may be carried out on a cloud server to lessen the computation load of the system 1, whereas the mask-based covering may be carried out on a mobile electronic device such as a smartphone, with different containers. In addition to being round, the mask can be in any other shape or decorated with, for example, a border, as long as the mask can be changed in the container for the images to be processed by the system 1.

Figure 4A:
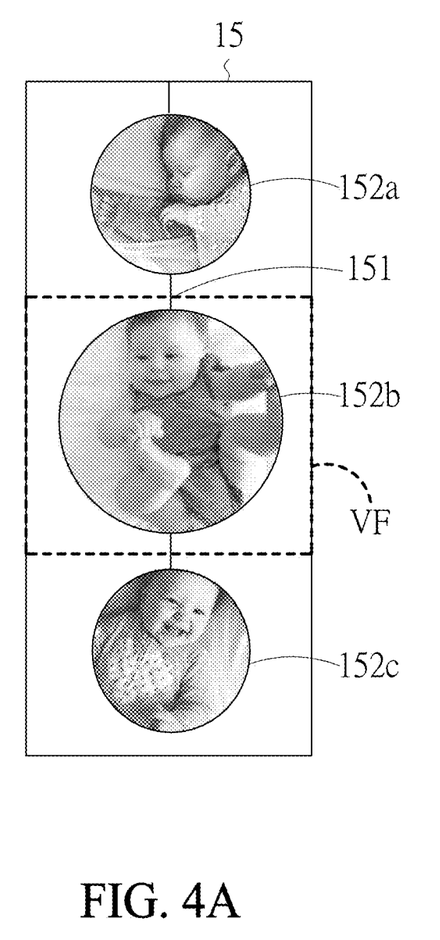
FIG. 4A is a schematic view showing a graphical user interface according to embodiments of the present disclosure.
Figure 4B:
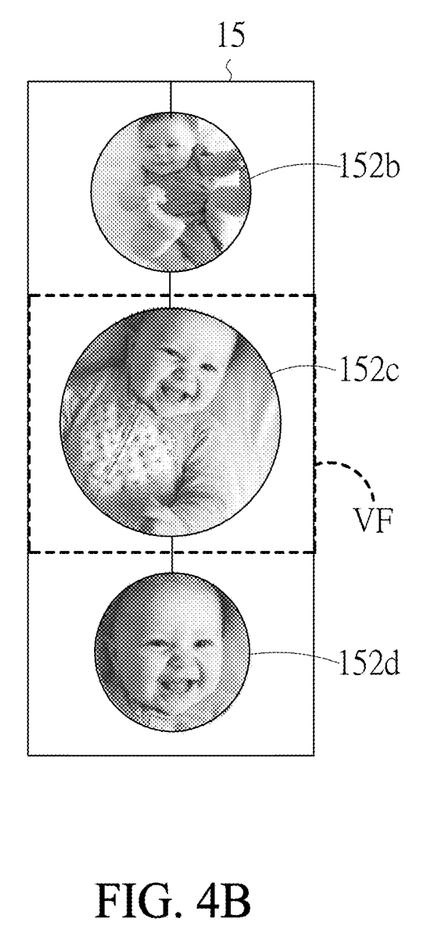
FIG. 4B is a schematic view showing a graphical user interface according to embodiments of the present disclosure.

After the images have been edited, the system 1 performs step 53 to provide a graphical user interface 15 and arrange the edited images according to a timeline and along a straight line 151 on the graphical user interface 15. Referring to FIG. 4A and FIG. 4B, the graphical user interface 15 is substantially in a shape of a rectangle, and the straight line 151 is parallel to a long side of the rectangle and passes a center of the rectangle. The edited images 152a, 152b and 152c are arranged according to the timeline in the time sequence at which they were taken. On the graphical user interface 15, the edited images 152a, 152b and 152c move along the straight line 151 simultaneously. For instance, when a user selects the edited image 152a and moves the edited image 152a along the straight line 151 toward the top of the graphical user interface 15, the edited images 152a, 152b and 152c move toward the top of the graphical user interface 15 simultaneously.

In this embodiment, when any one of the edited images 152a, 152b, 152c and 152d is located at a visual center VF of the graphical user interface 15, the one located at a visual center VF looks different from the others. The visual center VF of the graphical user interface 15 is pre-defined and is, as shown in FIG. 4A, a central area of the graphical user interface 15 or any pre-defined position or area in the graphical user interface 15. Referring to FIG. 4A, when the edited image 152b is the closest to the predefined visual center VF, the edited images 152a and 152c are scaled down, allowing the edited image 152b to look larger. For instance, as shown in FIG. 4A, assuming that the edited image 152b is at 1.0× magnification, the edited images 152a, 152c are at the lower magnification than the edited image 152b, i.e. less than 1.0× but equal to or more than 0.6×, such as 0.9×, 0.8×, 0.7×, or 0.6×. Referring to FIG. 4A, the edited image 152b is the largest edited image and is at the highest magnification. Therefore, when a plurality of images are displayed, the user is attracted spontaneously to a specific image, i.e., the edited image 152b.

Referring to FIG. 4B, when the edited image 152c is moved to the visual center, the edited images 152b and 152d are scaled down.

Figure 4C:
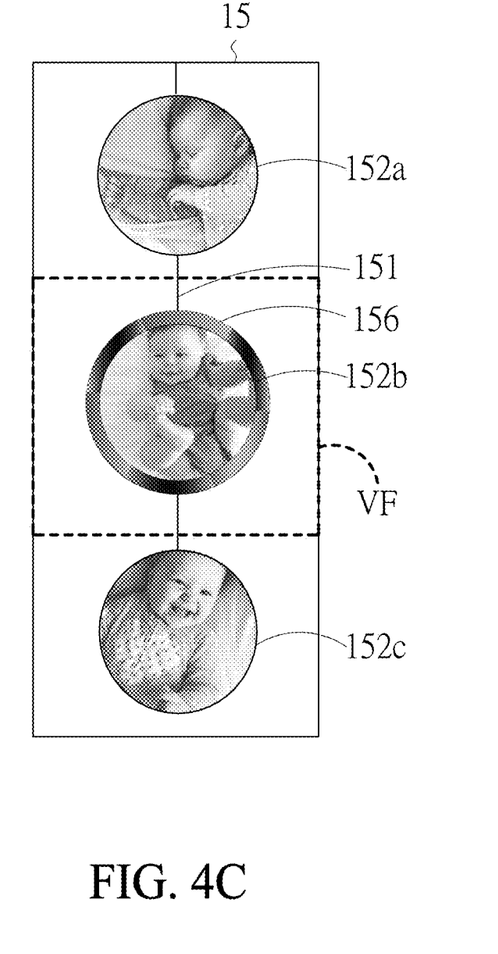
FIG. 4C is a schematic view showing a graphical user interface according to embodiments of the present disclosure.
Figure 4D:
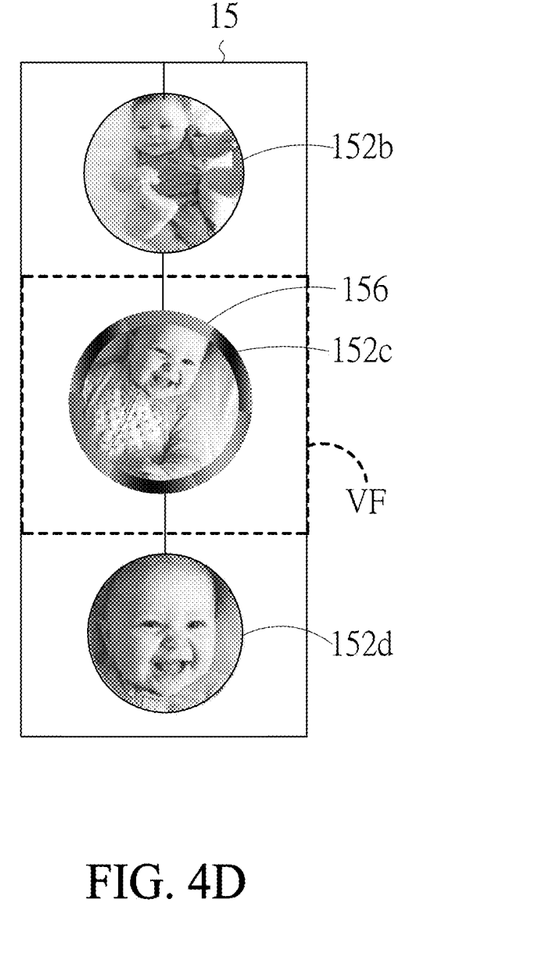
FIG. 4D is a schematic view showing a graphical user interface according to embodiments of the present disclosure.

Referring to FIGS. 4C and 4D, in this embodiment, the sizes of the edited images 152a, 152b, 152c and 152d on the graphical user interface 15 remain unchanged. When the edited image 152b is located at the visual center VF, it has a special effect, for example, a special border 156 not found in the other edited images. Referring to FIG. 4B, when the edited image 152c is moved to the visual center, the edited image 152c acquires the border 156. In other words, the containers of the edited images change the sizes of the edited images or give special effects to the edited images to highlight the edited image which is the closest to the visual center VF.

Figure 4E:
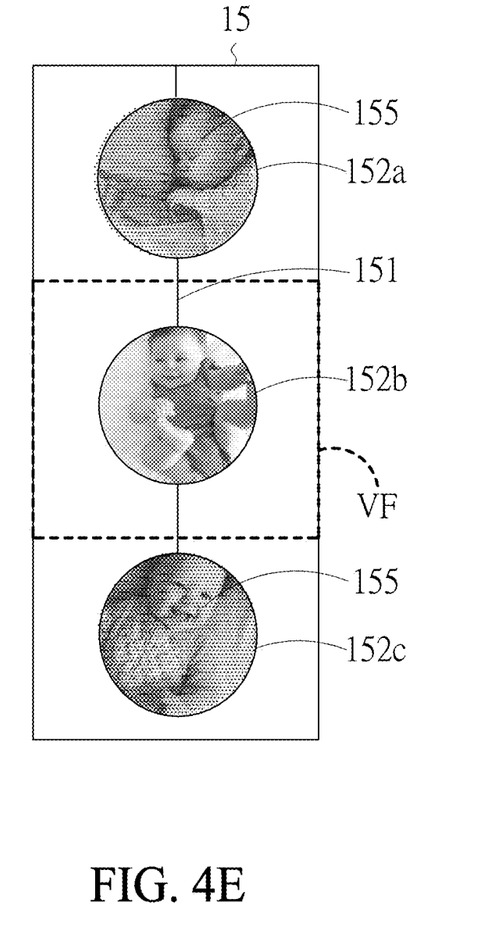
FIG. 4E is a schematic view showing a graphical user interface according to embodiments of the present disclosure.
Figure 4F:
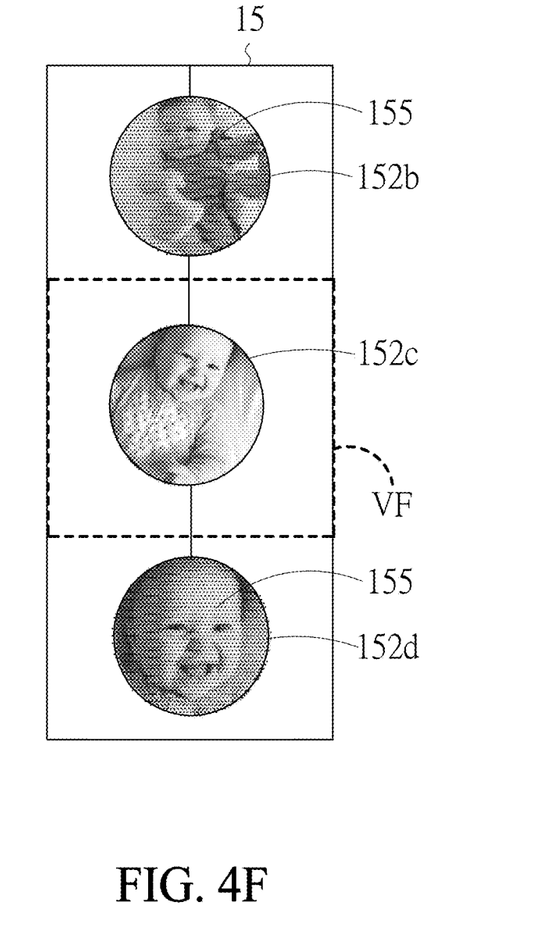
FIG. 4F is a schematic view showing a graphical user interface according to embodiments of the present disclosure.

Referring to FIGS. 4E and 4F, in this embodiment, after the edited image has been moved to the visual center, its special effect, for example, a translucent filter 155, is removed. In other words, on the graphical user interface 15, the edited images are normally covered with the translucent filter 155, but not covered with the translucent filter 155 when located at the visual center VF.

Figure 5A:
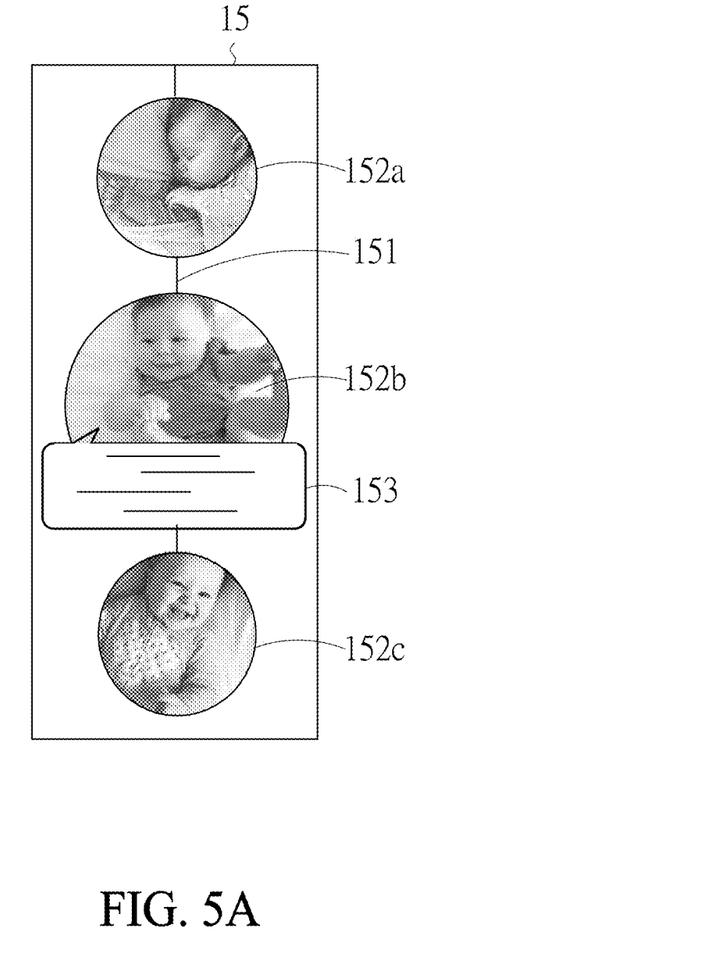
FIG. 5A is a schematic view showing a dialog box displayed on the graphical user interface and contents of the dialog databases according to embodiments of the present disclosure.

The system 1 further performs step 54 to provide a dialog box 153, corresponding to the edited image, on the graphical user interface 15. Referring to FIG. 5A, if the edited image 152b located at the visual center meets an activation condition, the system 1 will obtain a dialog content from a dialog database 154 in accordance with an attribute, and the dialog content will be shown in the dialog box 153. The attribute is a date related to the edited image located at the visual center, for example, the date on which the image was taken, the current date on which the user operates the system 1, or the position of the system 1. The activation condition is a specific date, a specific holiday, or a specific event related to the target 3.

Figure 5B:
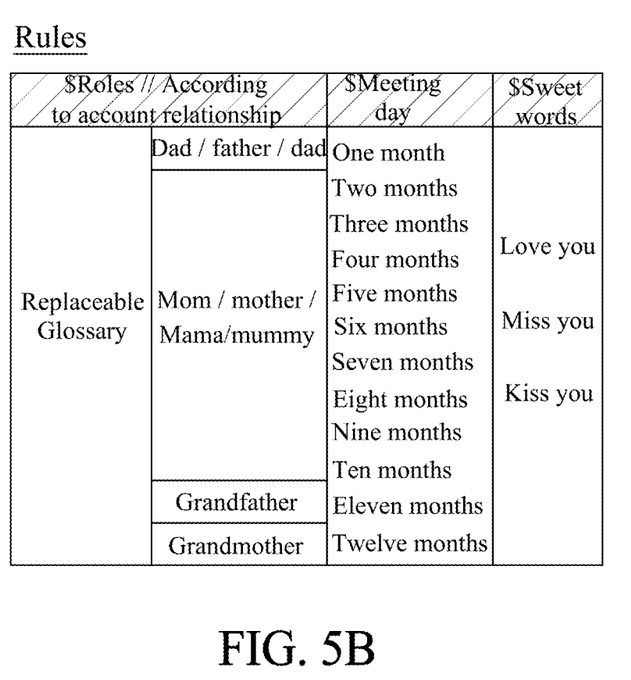
FIG. 5B is a schematic view showing a dialog box displayed on the graphical user interface and contents of the dialog databases according to embodiments of the present disclosure.
Figure 5C:
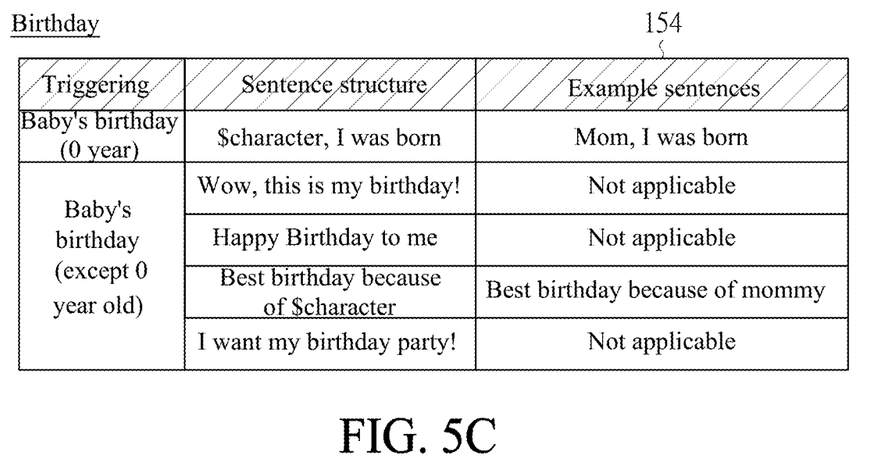
FIG. 5C is a schematic view showing a dialog box displayed on the graphical user interface and contents of the dialog databases according to embodiments of the present disclosure.
Figure 5D:
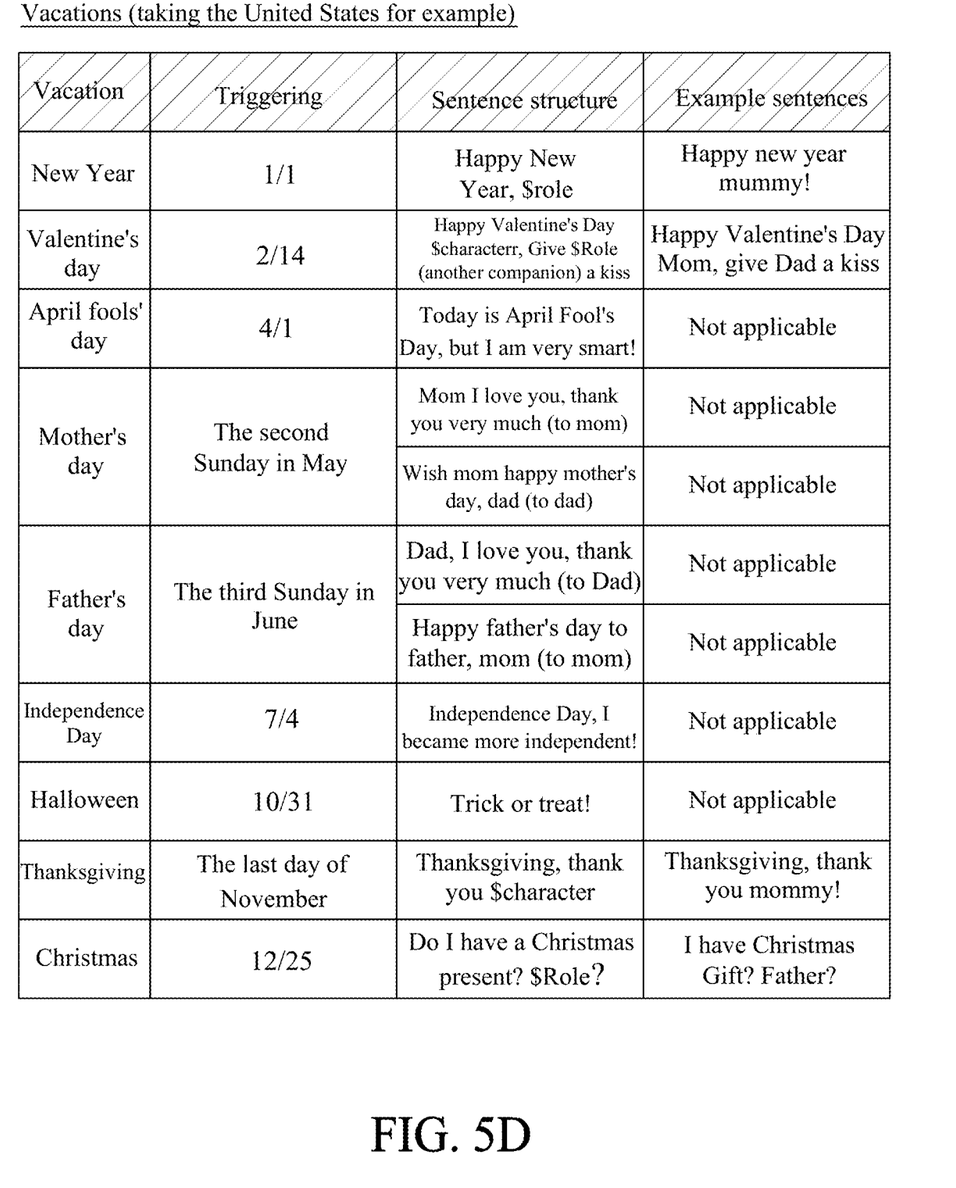
FIG. 5D is a schematic view showing a dialog box displayed on the graphical user interface and contents of the dialog databases according to embodiments of the present disclosure.
Figure 5E:
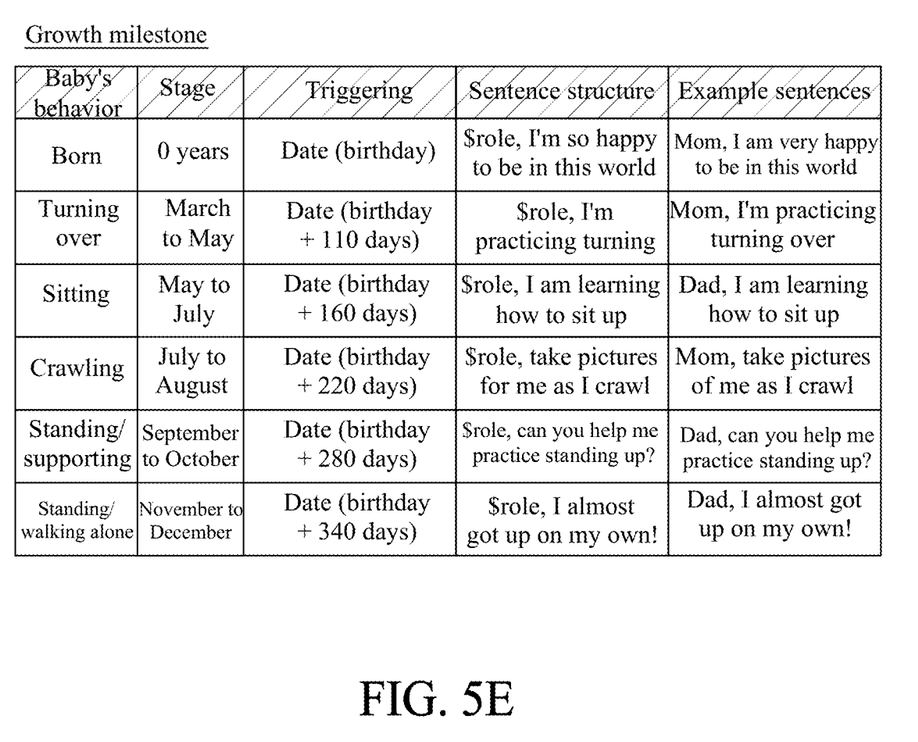
FIG. 5E is a schematic view showing a dialog box displayed on the graphical user interface and contents of the dialog databases according to embodiments of the present disclosure.

Referring to FIG. 5B through FIG. 5E, when the edited image 152b located at the visual center meets an activation condition, for example, the date on which the image was taken being a birthday of the target 3, the system 1 obtains a dialog content stored in the dialog database 154 and related to the birthday. The dialog database 154 stores various attributes and various dialog contents corresponding to the respective activation conditions. For example, as shown in FIG. 5B, the dialog database 154 defines "roles" and stores parameters corresponding to the "roles", respectively, for example, "father" and "mother". The dialog content may include sentence structures of the parameters, such that the sentences shown in the dialog box 153 are diverse. For instance, as shown in FIG. 5C, the dialog database contains four sentences available to the dialog content related to a birthday, and the system 1 chooses one of the four sentences at random to display it. The dialog database 154 also defines specific parameters whereby the dialog content is chosen. Referring to FIGS. 5D and FIG. 5E, the dialog databases include the dialog contents about holidays and baby developmental milestones, respectively, and also include attributes of activation, structures of the dialog contents, and sentence examples.

Figure 6:
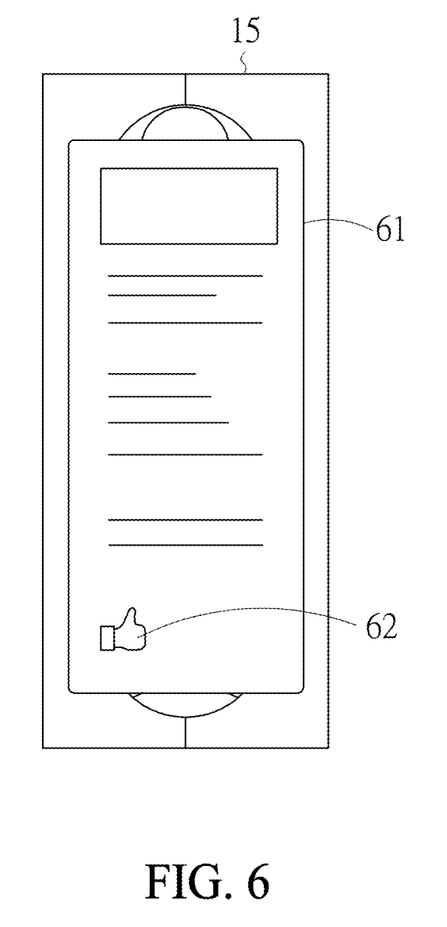
FIG. 6 is a schematic view showing a prompt message and a preference tag displayed on the graphical user interface according to an embodiment of the present disclosure.

Referring to FIG. 6, the system 1 further performs step 55 to display a prompt message 61. In the case that an activation condition is met, for example, the current date is the day on which the target 3 must receive a vaccine, the system 1 displays a vaccination-related prompt message on the graphical user interface 15. After selecting the prompt message, the user sets a preference tag 62 to the prompt message, for example, by giving a thumbs up to the prompt message to confirm that the prompt message is useful to the user.

Figure 7:
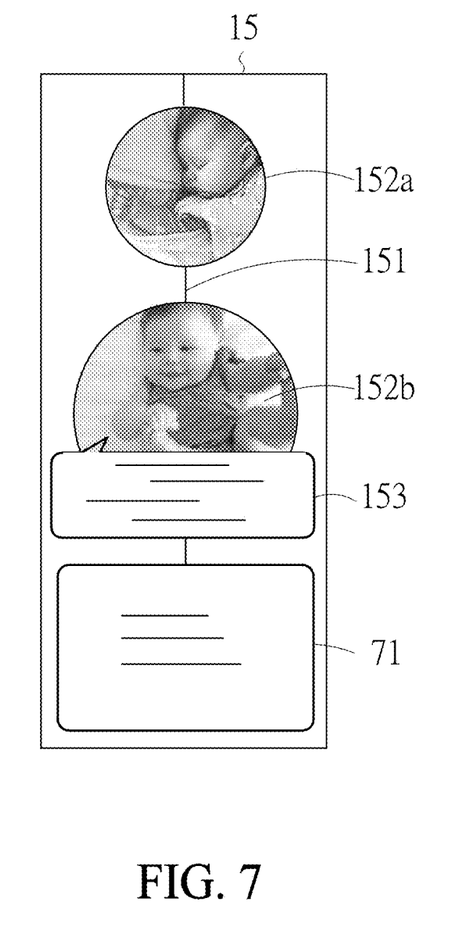
FIG. 7 is a schematic view showing an advertisement information displayed on the graphical user interface according to an embodiment of the present disclosure.

Referring to FIG. 7, upon the prompt message is selected and the preference tag 62 is set, the system 1 performs step 56 to display an advertisement information 71 corresponding to the prompt message. For instance, if the current date is the day on which the target 3 becomes a potential user of a specific product, the system 1 will display a related prompt message on the graphical user interface 15. If the user has set the preference tag 62 to the prompt message, the system 1 displays the advertisement information 71 pertaining to the product on the graphical user interface 15. When the advertisement information is selected, the system 1 performs step 57 to start a product purchase process whereby the user purchases the product.

Figure 8:
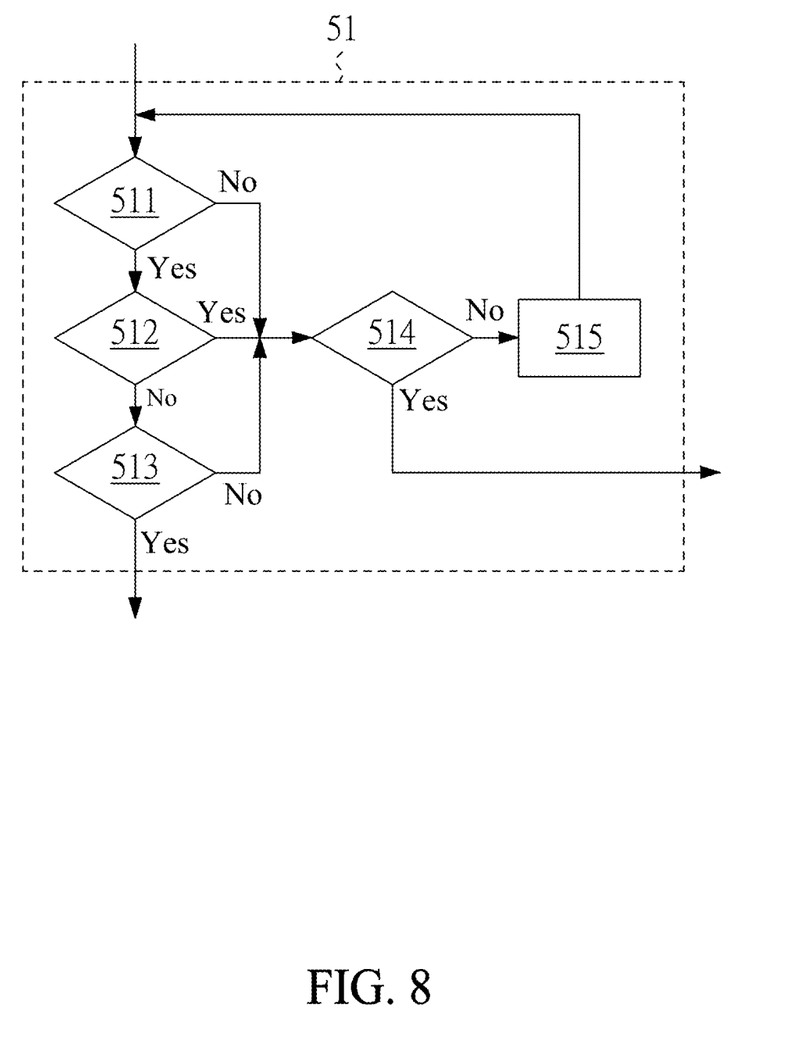
FIG. 8 is a schematic view illustrating the step of checking the taken images according to an embodiment of the present disclosure.

Persons skilled in the art can make various changes to the aforesaid embodiments without extending beyond the scope of the present disclosure. Referring to FIG. 8, in step 51, it is determined whether the image is acceptable, wherein the system 1 determines whether the image has a specific feature (step 511) and also determines whether the image has at least two specific features (step 512), i.e., whether the image has at least two human faces. If the system 1 determines that the image has at least two specific features, the images will be ignored. Alternatively, the system 1 determines whether a specific feature lies within a safe area (step 513), for example, be separated from the edges of the image by a specific distance. This ensures that subsequently enlarged circle will not go beyond the edges of the image.

To take satisfactory images, the system 1 controllably instructs the camera 2 to take images of the target 3, for example, every three minutes from 6 AM, every morning, and checks the taken images instantly for compliance with the aforesaid requirements, i.e., the taken image comprises only one specific feature and the specific feature lies within a safe area. If the taken image meets the requirements, the image-taking process ends. If the taken image fails to meet the requirements, the system 1 determines whether the current time has passed a predetermined ending time, for example, 9 AM, (step 514). If it is determined that he current time has not yet passed the predetermined ending time, the camera takes images every three minutes (step 515) until the taken image meets the requirements or until the predetermined ending time expires. Further, before taking images, the system 1 checks the status of the camera 2, for example, to determine whether the camera 2 is operating in a night sight mode.

In the aforesaid embodiments, the present disclosure can automatically identify and edit an image having a specific feature and display the edited images according to a timeline on a user interface to greatly lessen the user's burden.

While the present disclosure has been described by means of specific embodiments, numerous modifications and variations could be made thereto by those skilled in the art without departing from the scope and spirit of the present disclosure set forth in the claims.

What is claimed is:

1. A method for providing a timeline-based graphical user interface, comprising the steps of:
   receiving a plurality of edited images with respect to a target; and
   displaying the edited images on a graphical user interface and arranging the edited images according to a timeline, each of the edited image comprising a specific feature of the target,
   wherein the graphical user interface is in a shape of a rectangle, and the edited images are arranged along a straight line in a time sequence at which the edited images are taken, the straight line is parallel to a long side of the rectangle and passes a center of the rectangle; the straight line includes a plurality of line segments that are visually located between two or more of the edited images; the edited images are movable along the straight line in response to a selection operation.

2. The method of claim 1, wherein one of the edited images is the closest to a pre-defined visual center of the graphical user interface and is larger than remaining ones of the edited images.

3. The method of claim 1, further comprising the step of:
   providing one of the edited images, which is the closest to a pre-defined visual center of the graphical user interface, with a special effect.

4. The method of claim 1, further comprising the step of:
   removing a special effect from one of the edited images, which is the closest to a pre-defined visual center of the graphical user interface.

5. The method of claim 1, wherein the specific feature is a facial expression feature of the target.

6. The method of claim 1, further comprising the step of:
   providing a dialog box, corresponding to at least one of the edited images, on the graphical user interface.

7. The method of claim 6, wherein the step of providing the dialog box comprises:
   obtaining a dialog content from a dialog database in accordance with an attribute; and
   displaying the dialog content in the dialog box.

8. The method of claim 7, wherein the attribute comprises a date related to the at least one of the edited images.

9. The method of claim 1, further comprising the step of:
   displaying a prompt message on the graphical user interface.

10. The method of claim 9, further comprising the step of:
    displaying an advertisement message corresponding to the prompt message upon the prompt message is selected and a preference tag is set.

11. The method of claim 10, further comprising the step of:
    starting a product purchase process upon the advertisement message is selected.

12. A system for providing a timeline-based graphical user interface, comprising:
    a processor;
    a display device, and
    a storage device for storing a plurality of program commands, wherein after executing the program commands, the processor performs the steps of:
    receiving a plurality of edited images with respect to a target; and
    displaying the edited images on a graphical user interface of the display device and arranging the edited images according to a timeline, each of the edited images comprising a specific feature of the target,
    wherein the graphical user interface is in a shape of a rectangle, and the edited images are arranged along a straight line in a time sequence at which the edited images are taken, the straight line is parallel to a long side of the rectangle and passes a center of the rectangle; the straight line includes a plurality of line segments that are visually located between two or more of the edited images; the edited images are movable along the straight line in response to a selection operation.

13. The system of claim 12, wherein after executing the program commands, the processor performs the step of enabling one of the edited images which is the closest to a pre-defined visual center of the graphical user interface, to be larger than remaining ones of the edited images.

14. The system of claim 12, wherein after executing the program commands, the processor performs the step of providing a special effect to one of the edited images, which is the closest to a pre-defined visual center of the graphical user interface.

15. The system of claim 12, wherein after executing the program commands, the processor performs the step of removing a special effect from one of the edited images, which is the closest to a pre-defined visual center of the graphical user interface.

16. The system of claim 12, wherein the specific feature is a facial expression feature of the target.

17. The system of claim 12, wherein after executing the program commands, the processor performs the step of providing a dialog box, corresponding to at least one of the edited images, on the graphical user interface.

18. The system of claim 17, wherein after executing the program commands, the processor performs the steps of:

obtaining a dialog content from a dialog database in accordance with an attribute; and displaying the dialog message in the dialog box.

19. The system of claim 18, wherein the attribute comprises a date related to the at least one of the edited images.

20. The system of claim 19, wherein after executing the program commands, the processor performs the step of displaying a prompt message on the graphical user interface.

21. The system of claim 20, wherein after executing the program commands, the processor performs the step of displaying an advertisement information corresponding to the prompt message upon the prompt message is selected and a preference tag is set.

22. The system of claim 21, wherein after executing the program commands, the processor performs the step of starting a product purchase process when the advertisement information is selected.

23. A non-transient storage medium for storing a plurality of program commands, and the program commands being executable by an electronic device to perform the steps of:

receiving a plurality of edited images with respect to a target; and displaying the edited images on a graphical user interface and arranging the edited images according to a timeline, each of the edited images comprising a specific feature of the target, wherein the graphical user interface is in a shape of a rectangle, and the edited images are arranged along a straight line in a time sequence at which the edited images are taken, the straight line is parallel to a long side of the rectangle and passes a center of the rectangle; the straight line includes a plurality of line segments that are visually located between two or more of the edited images; the edited images are movable along the straight line in response to a selection operation.

24. The non-transient storage medium of claim 23, wherein after executing the program commands, the electronic device performs the step of enabling one of the edited images, which is the closest to a pre-defined visual center of the graphical user interface, to be larger than remaining ones of the edited images.

25. The non-transient storage medium of claim 23, wherein after executing the program commands, the electronic device performs the step of providing a special effect to one of the edited images, which is the closest to a pre-defined visual center of the graphical user interface.

26. The non-transient storage medium of claim 23, wherein after executing the program commands, the electronic device performs the step of removing a special effect from one of the edited image, which is the closest to a pre-defined visual center of the graphical user interface.

27. The non-transient storage medium of claim 23, wherein the specific feature is a facial expression feature of the target.

28. The non-transient storage medium of claim 23, wherein after executing the program commands, the electronic device performs the step of providing a dialog box, corresponding to at least one of the edited images, on the graphical user interface.

29. The non-transient storage medium of claim 28, wherein the step of providing the dialog box comprises:

obtaining a dialog content from a dialog database in accordance with an attribute; and displaying the dialog content in the dialog box.

30. The non-transient storage medium of claim 29, wherein the attribute comprises a date related to the at least one of the edited images.

31. The non-transient storage medium of claim 23, wherein after executing the program commands, the electronic device performs the step of displaying a prompt message on the graphical user interface.

32. The non-transient storage medium of claim 31, wherein after executing the program commands, the electronic device performs the step of displaying an advertisement information corresponding to the prompt message upon the prompt message is selected and a preference tag is set.

33. The non-transient storage medium of claim 32, wherein after executing the program commands, the electronic device performs the step of starting a product purchase process when the advertisement information is selected.

* * * * *